Oct. 31, 1933.    R. S. PULLEN    1,933,510
BALE FASTENING MEANS
Filed Oct. 19, 1931    2 Sheets-Sheet 1
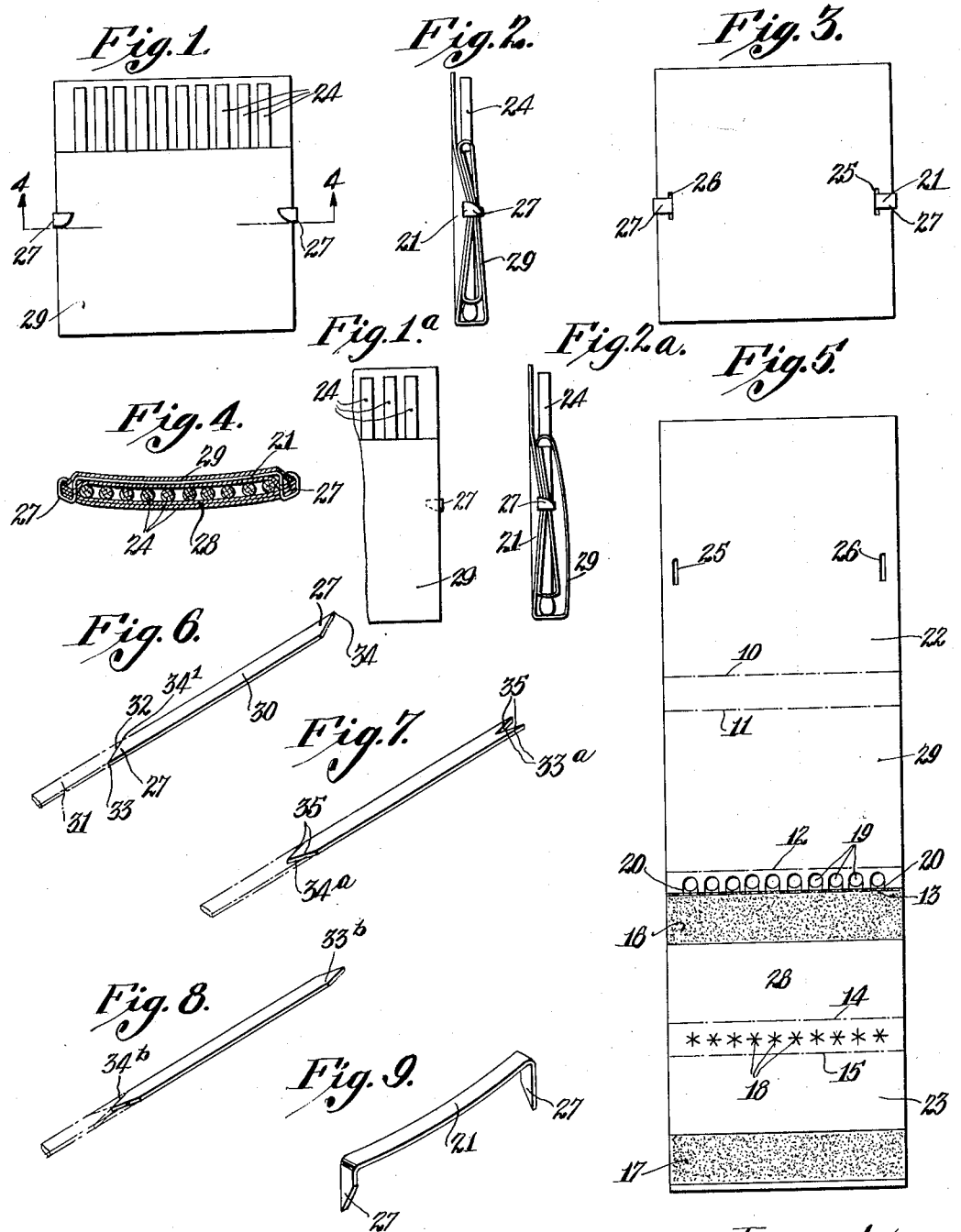

Oct. 31, 1933.  R. S. PULLEN  1,933,510
BALE FASTENING MEANS
Filed Oct. 19, 1931  2 Sheets-Sheet 2
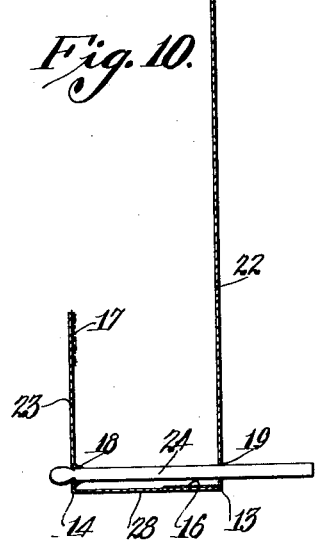
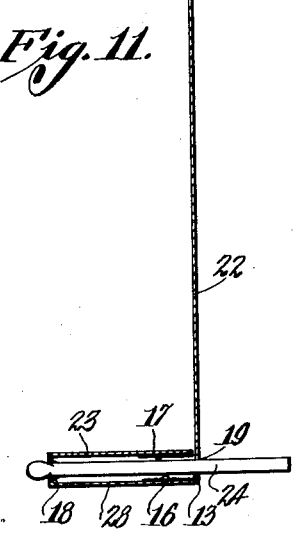
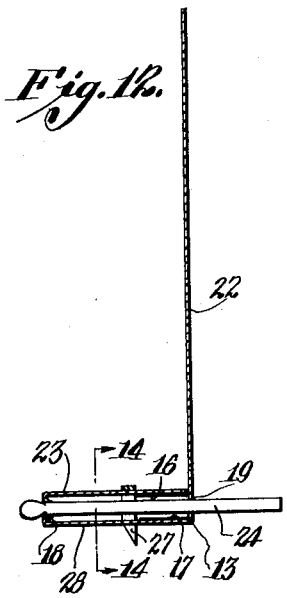
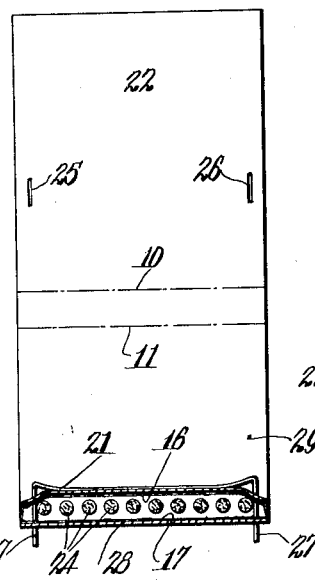
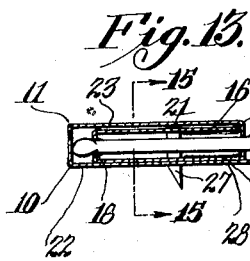
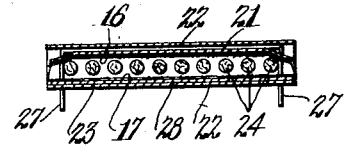
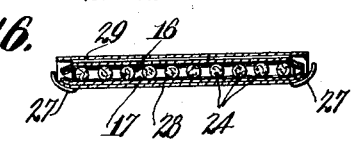
Inventor
Rodney S. Pullen
Witnesses:
Attorneys.

Patented Oct. 31, 1933

1,933,510

UNITED STATES PATENT OFFICE 1,933,510

BALE FASTENING MEANS

Rodney S. Pullen, Akron, Ohio, assignor to Pullenlite Company, Philadelphia, Pa., a corporation of Pennsylvania Application October 19, 1931. Serial No. 569,632

8 Claims. (Cl. 206—29)

My invention relates to match packets in which the matches are ignited during their longitudinal withdrawal, stick-end foremost, from the packet, the matches in the packet threading spaced rows of perforations of a wrap and the invention is more particularly directed to means for fastening the wrap to the folded position that it occupies in the finished packet.

In this type of match packet a short flap adjacent one row of perforations folds down against the exposed match portions intermediate the threaded rows and a long flap adjacent the other row of perforations folds down over the short flap then around the projecting match heads and up against the portion of the wrap intermediate the two rows of perforations and the wrap fastened in folded position, the present invention being directed to novel fastening means for holding the wrap in its final folded position.

One purpose of the present invention is to provide a packet of the type indicated with a novel structure that will be at once adapted to easy and inexpensive manufacture and well suited to the needs of service.

A further purpose is to outwardly fold the tines of a staple that extends transversely of a packet of the character indicated, the transverse staple desirably including between its tines before these are clutched or folded outwardly, the wrap portions directly adjacent opposite sides of the matches and also an outer portion of the long flap.

A further purpose is to provide a desirable form of staple for a bale and that avoids any waste of bale material.

A further purpose is to make the pointed ends or tines of a bale relatively supplementary with respect to the strip from which the bale blanks are cut, so that each cut from a continuous strip of bale material produces at the cut supplementary pointed ends, one on the severed bale blank and the other on the continuous strip to form one end of the next succeeding bale.

Further purposes will appear in the specification and in the claims.

I have elected to show one main form only of my invention, with a few minor modifications thereof.

Figures 1, 2 and 3 are respectively front, left side and rear elevations of a match packet embodying a desirable form of the present invention.

Figures 1a and 2a are views corresponding respectively to Figures 1 and 2, showing a somewhat different form, Figure 1 being fragmentary.

Figure 4 is a section of Figure 1 taken upon the line 4—4 thereof.

Figure 5 is a view showing an open wrap blank such as may be used in the packet of Figures 1 to 4.

Figures 6, 7 and 8 are perspective views illustrating slightly different forms of bale preparatory to bending the bale into a staple, a portion of the continuous strip from which the bale blanks are cut being shown in dot-and-dash lines in Figures 6 and 7.

Figure 9 is a perspective view of a staple such as may be made except as to the tines from any of the bales of Figures 6, 7 and 8, the staple of Figure 9 however including the tines of Figure 6 intended as a conventional showing for any suitable tines.

Figures 10, 11, 12 and 13 are sectional side elevations illustrating a packet in process of manufacture at progressively different stages thereof.

Figure 14 is a section taken upon the line 14—14 of Figure 12.

Figure 15 is a section taken upon the line 15—15 of Figure 13.

Figure 16 is a view corresponding to Figure 15 except that the tines of the staple, not clinched in Figure 15, are partially clinched in Figure 16, and are completely clinched in Figure 4, the outward clinching being an important feature of the present invention.

Like numerals refer to like parts in all figures.

Describing in illustration and not in limitation and referring to the drawings:—

A typical wrap blank for a match packet of the type to which the present invention is directed is intended to be illustrated in Figure 5 which presents the inside face of the blank or card toward the beholder. Each card is assembled with matches and a metal fastener to form a finished match packet, the present invention being directed chiefly to details of the fastener.

The outside, or in Figure 5 the under face of the card, is scored at the dot-and-dash lines 10, 11, 12, 13, 14 and 15, and strip portions 16 and 17 of the inside or upwardly presented face in Figure 5, are coated with ignition material.

The card is also provided with a transverse row of petticoated holes 18 between the score lines 14 and 15 and a second transverse row of holes 19 between the score lines 12 and 13, the latter holes being usually clean-cut and round.

For manufacturing purposes it is frequently desirable to weaken portions of the card adjacent the holes 19 and preferably toward the strip of ignition material 16, this weakening being suitably accomplished by providing short slits or score lines 20 from the individual holes into the strip of ignition material 16.

The petticoats of successive petticoated holes 18 are preferably relatively staggered in order to increase the distance between the radial cuts of one hole and the corresponding cuts of the adjacent holes and to thereby avoid weakening the card unduly along the row of petticoated holes.

The present invention is directed more particularly to the fastening of the wrap in the position that it occupies in the finished packet, this fastening being accomplished by a bale 21, Figure 4, that is formed into a staple which in the finished packet extends across the packet under the first fold of the long flap and embraces in the grip of its tines the remaining three thicknesses of the folded wrap.

These bales are normally manufactured from a continuous strip of bale material, which delivers from a roll of the bale material, each bale being cut from the strip at one stage of the packet assembly, formed into a staple and inserted before and crimped or clinched after the folding down and around of the long flap.

In the assembly of the packet the long flap 22 and the short flap 23 are folded up along the scored lines 13 and 14 respectively and the matches 24 are inserted stick-end forward through the petticoated holes 18 and then the round holes 19, the partially completed packet being now approximately as indicated in Figure 10.

The short flap 23 is then folded down upon the matches upon the portions thereof intermediate the perforations 18 and 19 of the wrap, as indicated in Figure 11, which represents the partially assembled packet in the stage at which it is ready to receive the bale fastener.

The bale has by this time been cut from a continuous strip of bale material and bent into a staple, with a shape about as indicated in Figure 9, the body portion between the tines curving forwardly at the middle in the direction of the staple insertion.

The staple, preferably inserted by suitable mechanism, is inserted across the downwardly folded short flap 23 near or at the opposing strips 17 and 16 of ignition material, being at the inner edges of these strips in Figures 12 and 14 which show the partially assembled packet at this stage of manufacture the staple 21 having been inserted but not crimped or clinched.

The long flap may suitably be provided with perforations 25 and 26, Figures 5 and 14, to register with and pass the tines 27 of the staple, although these perforations are optional.

From the stage illustrated in Figures 12 and 14 the long flap 22 is folded down first about the score line 12 and then successively about the score lines 11 and 10 around the match heads and up against the portion 28 of the wrap intermediate the score lines 13 and 14, to the position of Figures 13 and 15, with the perforations 25 and 26 receiving the downwardly projecting tines 27 of the staple.

After reaching the stage of Figures 13 and 15 the projecting tines 27 are crimped or clinched outwardly.

In the prior art crimping or clinching of the tine ends of a transverse bale of a match packet of the character indicated has been inwardly and the outward crimping of the tines as compared to the inward crimping of the prior art forms an important feature of the present invention, resulting in a more easy assembly of the packet and a better packet, the inward crimping of the prior art having resulted in an uncertainty of ignition when withdrawing the matches adjacent the tines.

The tines 27 are turned outwardly and then inwardly outside the first fold 29 of the long flap to the position shown in Figures 1, 2 and 4 or optionally under the first fold of the long flap to the position shown in Figures 1a and 2a.

The form shown for Figures 1 and 2 is usually preferable to that shown in Figures 1a and 2a in that the inclusion of the first fold 29 within the crimp of the tines desirably increases the tension of this fold, making a tighter packet and thereby avoiding any danger of coins or the like inadvertently lodging in the space beneath the first fold 29 of the long flap, which has sometimes happened in the packets of the form of Figures 1a and 2a.

It will be noticed that in Figure 4 the packet has a transverse curving by reason of the initial spring curve of the staple.

This spring curving of the staple secures a resilient pressure along and under the staple of the wrap portions presenting the ignition material against the intermediate matches, and thereby insures ignition during match withdrawal.

I prefer to shape the bale or staple in a way to avoid any waste of bale material incident to the cutting of successive bale blanks from a continuous strip of bale material, and thereby to completely convert the material of the continuous strip into staples, and I show in Figures 6 and 7 two only of the different ways in which the ends of the staple may be formed so that each cut from the continuous strip may be the same as each other cut and leave pointed ends respectively on the severed blank and on the continuous strip for the tines of opposite ends of successive staples.

In Figure 6 the bale blanks 30 are cut diagonally from the continuous strip 31, as at 32 which leaves adjacent and supplemental pointed ends 33 and 34 respectively on the severed staple blank 30 and on the continuous strip 31 that are well suited to be tine ends of the finished staple.

The pointed end 34 of the strip will make one tine of the next staple just as the tine end 34' of the severed blank was made in the cutting away of the preceding blank.

While I prefer to make the diagonal cuts that sever the staple blanks from the continuous strip extend diagonally across the strip in a single straight cut as in Figure 6, making the point of the tine on one edge of the strip I may make the cut double, as indicated at 35, Figure 7 which gives supplemental double pointed and single pointed ends 33a and 34a respectively, one of which forms one tine end of the severed blank and the other a tine end of the next blank.

In the form of Figure 4 and also in that of Figure 6 the successive cuts severing the successive bales from a continuous strip are all alike and there is no waste whatever of baling material but the tines of the individual staples are not alike, each being a supplement of the other, considered with respect to the width of the strip material from which the blanks are successively cut.

In the form of Figure 8 the bale ends are pointed as at 33b and 34b toward the middle of the strip and the points are the same at both ends of the staple and as a result there will usually be some waste of bale material at each cut.

In the form of bale having one or more double tines, for example as indicated at 34a of Figure 7, it will be usually preferable to have the wrap perforated as indicated at 25 and 26 of Figures 5 and 14. In either of the other forms this perforation is optional.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In a match packet of the character indicated, a row of laterally spaced matches, a wrap folded longitudinally of and threaded by the matches and a bale transversely of the matches holding the wrap in its folded position and having tines outside the end matches of the row, penetrating a plurality of the folds of the wrap and clinched outwardly.

2. In a match packet of the character indicated, a row of laterally spaced matches, a wrap folded longitudinally of and threaded by the matches and a bale transversely of the matches holding the wrap in its folded position and having tines outside the end matches of the row, penetrating a plurality of the folds of the wrap and clinched outwardly and having a body intermediate the tines curving the packet along the body across the matches from the sides of the packet toward the middle thereof in the direction of tine insertion.

3. In a match packet of the character indicated, a row of laterally spaced matches, a wrap having longitudinally spaced portions threaded by the matches, a short flap from adjacent the matches at the projecting match heads folded down upon the stick portions of the matches intermediate the said spaced threaded portions and a long flap from adjacent the matches at the projecting sticks thereof folded down upon the short flap thence around the match heads and up against the wrap intermediate the match threaded portions to form a back for the packet and a bale extending outside the folded short flap transversely of the matches and having tines outside the end matches of the row extending through three thicknesses of the folded wrap and then clinched outwardly away from the enclosed matches.

4. In a match packet of the character indicated, a row of laterally spaced matches, a wrap having longitudinally spaced portions threaded by the matches, a short flap from adjacent the projecting match heads folded down upon the matches intermediate the said spaced threaded portions and a long flap from adjacent the projecting match sticks folded down upon the short flap thence around the match heads and up against the wrap portion threaded by the matches to form a back for the packet and a bale extending across the matches outside the folded short flap and inside the first fold of the long flap and having tines outside the matches extending through three thicknesses of the folded wrap and then clinched on the back of the packet outwardly away from the enclosed matches.

5. In a match packet of the character indicated, a row of laterally spaced matches, a wrap having longitudinally spaced portions threaded by the matches, a short flap inwardly adjacent the matches at the head ends thereof and folded down upon the matches intermediate the said spaced portions and a long flap folded in a direction reverse to the fold of the short flap from inwardly adjacent the projecting match sticks down upon the short flap thence around the match heads and up against an intermediate wrap portion threaded at opposite ends by the matches and a bale extending across the matches outside the folded short flap and having tines outside the matches extending through the three thicknesses of folded wrap, clinched outwardly from the back of the packet and crimped around the edges of the four folds of the wrap.

6. In a match packet of the character indicated, a row of laterally spaced matches, a wrap having longitudinally spaced portions threaded by the matches, a short flap from inwardly adjacent the match heads and folded down upon the matches intermediate the said spaced portions and a long flap folded in a direction reverse to the fold of the short flap from inwardly adjacent the projecting match sticks down upon the short flap thence around the match heads and up against an intermediate wrap portion threaded at opposite ends by the matches and a bale extending across the matches outside the folded short flap and inside the first fold of the long flap and having tines outside the matches extending through the three thicknesses of folded wrap, clinched outwardly from the back of the packet and crimped around the edges of the four folds of the wrap.

7. In a match packet of the character indicated, a row of laterally spaced matches, a wrap having longitudinally spaced portions threaded by the matches, a short flap from inwardly adjacent the match heads and folded down upon the matches intermediate the said spaced portions and a long flap folded in a direction reverse to the fold of the short flap from inwardly adjacent the projecting match sticks down upon the short flap thence around the match heads and up against an intermediate wrap portion threaded at opposite ends by the matches and a bale extending across the matches outside the folded short flap and inside the first fold of the long flap and having tines outside the matches extending through the three thicknesses of folded wrap, clinched outwardly from the back of the packet around the edges of the said three thicknesses and in under the first fold of the long flap.

8. In a match packet of the character indicated, a row of laterally spaced matches, a wrap having longitudinally spaced portions threaded by the matches, a short flap from inwardly adjacent the match heads folded down upon the matches intermediate the said spaced portions and a long flap folded in a direction reverse to the fold of the short flap from inwardly adjacent the projecting match sticks down upon the short flap thence around the match heads and up against an intermediate wrap portion threaded at opposite ends by the matches and a bale extending across the matches outside the folded short flap and having tines outside the matches extending through the three thicknesses of folded wrap and clinched outwardly from the back of the packet around the edges of the said three thicknesses, to end adjacent the body of the bale.

RODNEY S. PULLEN.